United States Patent [19]

Hosaka

[11] Patent Number: 4,615,410
[45] Date of Patent: Oct. 7, 1986

[54] METHOD OF DETECTING SLIP OF DRIVING WHEEL OF AUTOMOTIVE VEHICLE

[75] Inventor: Akio Hosaka, Yokohama, Japan

[73] Assignee: Nissan Motor Co., Ltd., Yokohama, Japan

[21] Appl. No.: 680,786

[22] Filed: Dec. 12, 1984

[30] Foreign Application Priority Data

Dec. 14, 1983 [JP] Japan .................. 58-234145

[51] Int. Cl.⁴ ........................................... B60K 31/00
[52] U.S. Cl. ................... 180/197; 340/52 R; 364/426
[58] Field of Search ........... 180/197; 340/52 R, 52 B; 364/426, 431.11

[56] References Cited

U.S. PATENT DOCUMENTS

| | | | |
|---|---|---|---|
| 3,825,902 | 7/1974 | Brown et al. | 364/200 |
| 3,905,025 | 9/1975 | Davis et al. | 364/200 |
| 4,086,563 | 4/1978 | Bachman | 180/197 X |
| 4,164,872 | 8/1979 | Weigl | 180/197 X |
| 4,355,360 | 10/1982 | Asano et al. | 364/431.11 |
| 4,419,654 | 12/1983 | Funk | 180/197 |

FOREIGN PATENT DOCUMENTS

53-12447 2/1978 Japan .
54-58165 5/1979 Japan .
55-32918 3/1980 Japan .
55-125334 9/1980 Japan .
55-160137 12/1980 Japan .
56-24255 3/1981 Japan .
56-24256 3/1981 Japan .
57-33253 2/1982 Japan .
57-47056 3/1982 Japan .
57-185501 11/1982 Japan .
57-185501 11/1982 Japan .
58-13140 1/1983 Japan .
58-38347 3/1983 Japan .
58-25853 5/1983 Japan .

Primary Examiner—John A. Pekar
Attorney, Agent, or Firm—Schwartz, Jeffery, Schwaab, Mack, Blumenthal & Evans

[57] ABSTRACT

A method of detecting a slip of a driving wheel of an automotive vehicle is disclosed. According to this method, a vehicle acceleration is determined on signals used to control a power train of the vehicle, and a target vehicle speed, i.e., a vehicle speed which ought to be accomplished with the vehicle acceleration, is computed, a peripheral speed of the driving wheel is determined, and the occurrence of a slip is determined in response to a difference between the target vehicle speed and the peripheral speed.

14 Claims, 12 Drawing Figures

METHOD OF DETECTING SLIP OF DRIVING WHEEL OF AUTOMOTIVE VEHICLE

BACKGROUND OF THE INVENTION

The present invention relates to a method of detecting a slip of a driving wheel of an automotive vehicle which is likely to occur at start-up or acceleration.

A slip is detected to generate a slip indicative signal to be used in controlling a power train such that the occurrence of a slip is prevented upon detection of the slip. According to a conventional method of controlling a power train so as to prevent the slip from occurring, as disclosed in Laid-open Japanese Patent Application No. 58-38347, a slip is detected on a difference between an average value between revolution speeds of two front wheels and that between revolution speeds of two rear wheels (driving wheels), and the supply of fuel to an engine, which is a power source of the power train, is discontinued when the slip is detected in order to prevent the slip from occurring.

However, this slip detecting method poses a problem which attributes to the fact that each of the four wheels needs one wheel revolution speed sensor, thus requiring four in total per each automotive vehicle. The problem is that a detector carrying out the method is complicated in installing including wiring of the sensors and requires an increasing number of components, thus pushing up cost and accounting for high rate of failures of the detector.

Figure 11:
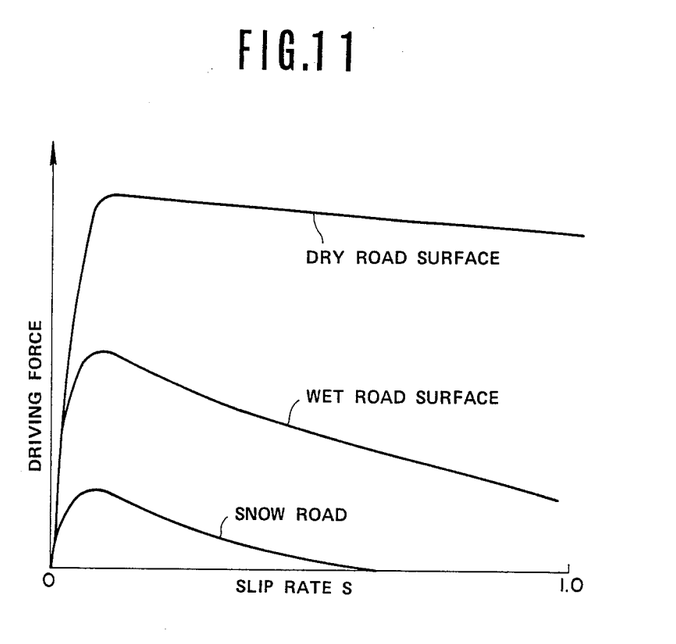
FIG. 11 is a graph showing driving force vs. slip rate characteristic curves for different road conditions.

Referring to FIG. 11, there is shown how a driving force of a driving wheel varies versus a variation in a slip rate S of the driving wheel for different road conditions including a dry road, a wet road and a snow road. The slip rate S is expressed as $$S = (PSD - GSV)/PSD$$

where:

PSD is an abbreviation of a peripheral speed of a driving wheel,

GSV is an abbreviation of a ground speed of a vehicle. When a driving wheel is given a torque greater than a value corresponding to a driving force plotted on the corresponding curve to one of the different road conditions, the driving wheel begins to slip, and once it slips, the slip rate increases, whereas the driving force decreases, and the driving force slips at a rapid rate owing to the feedback between the slip rate which increases and the driving force which decreases under the application of output torque by the power train, thus disabling the vehicle to start and causing the vehicle to side slip. Therefore, it is desired that the power train be controlled such that the slip rate S always stays lower than a predetermined value which is determined so as to prevent the output torque from exceeding the plotted driving force level for each of the road condition. By so controlling, the vehicle is allowed to perform safe start-up and acceleration even on wet roads or snowy roads.

SUMMARY OF THE INVENTION

An object of the present invention is to provide a method of detecting a slip which does not require any wheel revolution speed sensor.

According to the present invention, there is provided in an automotive vehicle having a driving wheel which is driven by a power train thereof, a method of detecting a slip of the driving wheel, comprising:

determining a target vehicle speed on an operating state of the power train and generating a target vehicle speed indicative signal, the target vehicle speed being the desired vehicle speed to be accomplished by the automotive vehicle in the operating state;

detecting a peripheral speed of the driving wheel and generating a peripheral speed indicative signal; and determining the presence of a slip in response to a difference between the target vehicle speed indicative signal and the peripheral speed indicative signal and generating a slip indicative signal.

DETAILED DESCRIPTION OF THE INVENTION

Hereinafter, the present invention is described in detail based on an illustrated embodiment.

Figure 1:
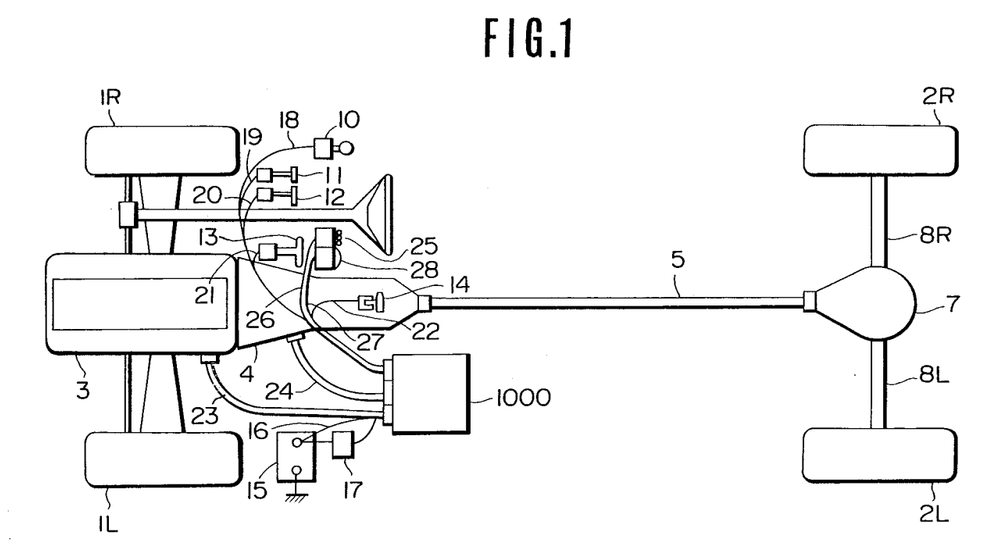
FIG. 1 is a plan view of an automotive vehicle illustrating a control system for carrying out a method according to the present invention.

Referring to FIG. 1, there is shown a power train of an automotive vehicle whose driving wheels are to be controlled on a slip indicative signal which is generated in accordance with the present invention using various signals used in controlling the power train. The term "power train" is used herein to mean a power generating and delivery system which includes an engine and a transmission. In the Figure, 1L, 1R designate left and right front wheels, respectively, 2L, 2R designate left and right rear wheels, 3 designates an engine, 4 designates a transmission (automatic transmission), 5 designates a propeller shaft, 7 designates a differential gear, 8L, 8R designate left and right rear axles. The front wheels 1L, 1R designate change direction wheels which are controlled by a steering wheel 9 to change direction of the automotive vehicle. The rear wheels 2L, 2R are driving wheels of the automotive vehicle which receive the output of the engine 3 that is delivered via the transmission 4, propeller shaft 5, differential gear 7 and axles 8L, 8R.

The shaft, operation and stop of the engine 3 is controlled by an ignition switch 10. The engine 3 can increase its output as the accelerator pedal 11 is depressed. The output of the engine 3 is delivered in the above mentioned delivery path to the rear wheels 2L, 2R, enabling the vehicle to run. The vehicle can be stopped by depressing a brake pedal 12 and parked by manipulating a parking brake 13.

The transmission 4, which forms together with the engine 3 a power train whose driving wheels are to be controlled such that they will not slip, is rendered to establish a selected power delivery path in response to a manipulating position assumed by a select lever 14, such as a parking (P) range, a reverse (R) range, a neutral (N) range, a forward automatic drive (D) range, a manual second (II) brake range or a manual first (I) brake range and delivers the power from the engine 3 to the propeller shaft 5 with a selected gear position in a selected one of the drive ranges R, D, II and I.

The power train control system, which carries out various controls including a control for preventing the driving wheels from slipping upon detecting a slip condition by a method according to the present invention, comprises a control unit 1000 which is common to the engine 3 and the transmission 4. This control unit is always supplied via an electric path 16 with an electric power which serves as a direct continuously connected electric power source from a vehicle battery 15 and it operates on an electric power from the vehicle battery 15 which is supplied thereto as a main power source via a power source relay 17 that is closed when the ignition switch 10 is turned ON. Although they are described later, those signals which are fed to the control unit 1000 are a signal from the ignition switch 10 via an electric path 18, a signal from the accelerator pedal 11 via an electric path 19, a signal from the brake pedal 12 via an electric path 20, a signal from the parking brake lever 13 via an electric path 21, a signal from the select lever 14 via an electric path 22, signals indicative of a crank angle of the engine 3, a crankshaft torque, an intake air flow rate and a temperature via a wire harness 23, and signals indicative of an output shaft revolution speed of the transmission 4 and an output shaft torque thereof via a wire harness 24. Based on these input signals arithmetic operations are performed and the results are fed via the wire harnesses 23, 24 to the engine 3 and the transmission 4, respectively, thereby to control them. The control unit 1000 is also supplied via an electric path 26 with data input signals from a data input device 25 manually operable by a driver, alters its operation mode depending on these data input signals and feeds various kinds of data via an electric path 27 to a display 28 where the data are displayed.

Figure 2:
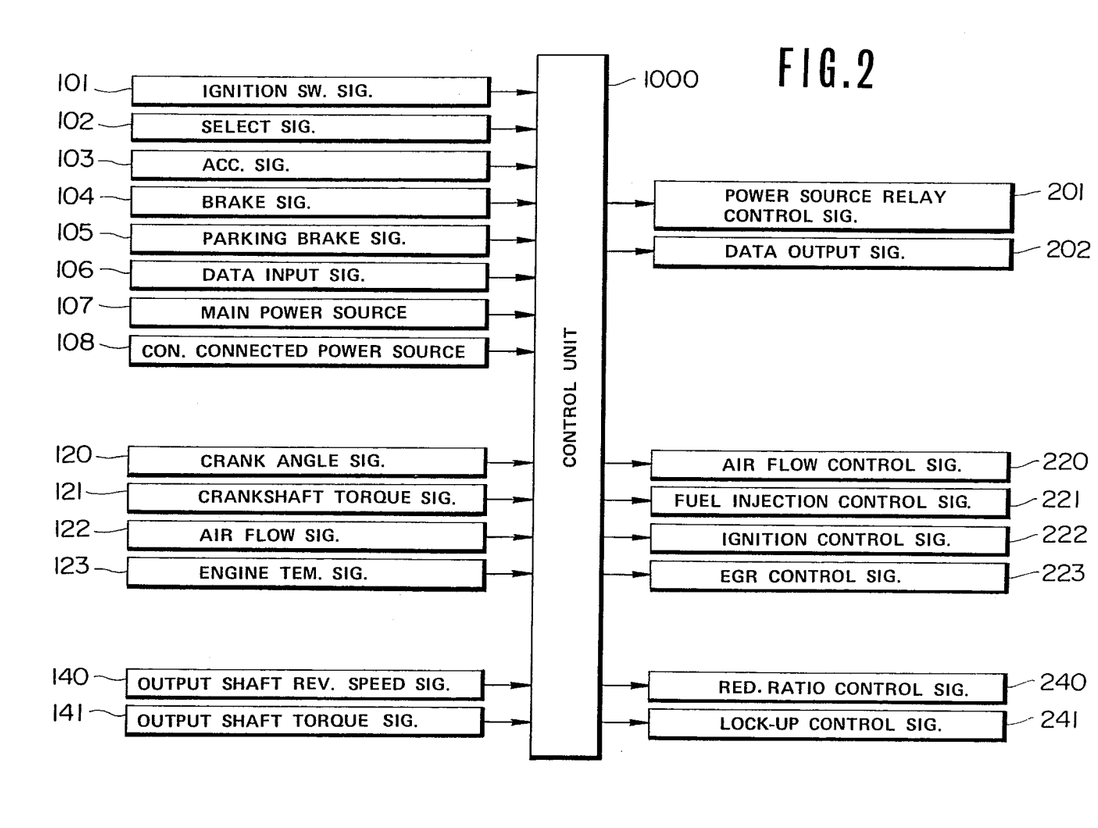
FIG. 2 is a block diagram illustrating a control unit with its various input and output signals.

Referring to FIG. 2, these input and output signals to and from the control unit 1000 are described in detail one after another. Among the input signals, an ignition switch signal 101 is indicative of which one of operation positions the ignition switch 10 assumes including a LOCK position, an OFF position, an ACCESSORY position, an ON position and a START position, and it is fed to the control unit 1000 via the electric path 18. Since the functions when the ignition switch 10 assumes these operation positions are well known, the description is omitted. A select signal 102 is indicative of which one of the before mentioned drive ranges P, R, N, D, II, I is selected via the electric path 28. An accelerator signal 103 which is a voltage signal variable in proportion to the depression degree of the accelerator pedal 11 is obtained by a potentiometer and fed to the control unit 1000 via the electric path 19. A brake signal 104 which is a voltage signal variable in proportion to the depression degree of the brake pedal 12 is obtained by a potentiometer and the like and fed to the control unit 1000 via the electric path 20. A parking brake signal 105 is obtained by a potentiometer and the like that is movable with the parking brake lever 13, which signal is a voltage signal variable in proportion to an operating position of the parking brake lever 13 and fed to the control unit 1000 via the electric path 21. Instead, the brake signal 104 and the parking brake signal 105 may be obtained by pressure sensors, each responsive to a bias force (a braking force) of a brake element. The signals 103, 104 and 105, although they were described previously as analog signals, may take the digital form by using encoders and the like.

A data input signal 106 is a signal from a key board of the data input device 25 or a switch and fed to the control unit 1000 via the electric path 26. The data input signal 106 specifies one of operation modes of the control unit 1000, for example a control operation mode and a self-checking mode or a power mode and a fuel economy mode. Such data input signal 106 is found in Laid-open Japanese Patent Application No. 58-13140. The main power source 107 is fed to the control unit 1000 via the power source relay 17 from the vehicle battery 15. The continuously connected power source 108 is always fed to the control unit 1000 via the electric path 16 from the battery 15.

A crank angle signal 120 is a pulse signal which is generated each time after the engine crankshaft has turned through a predetermined angle, which signal is fed to the control unit 1000 via the wire harness 23. This signal is generated by a photoelectric detector which detects a light passing through a slit plate, i.e., a disc rotatable with the crankshaft and formed with equiangularly distant slits. A crankshaft torque signal 121 is a voltage signal variable in proportion to the torque impressed on the crankshaft, the torque being detected using the piezoelectric effect. This signal is fed to the control unit 1000 via the wire harness 23. This signal 121 can be obtained by a torque sensor which is described in Laid-open Japanese Patent Application No. 53-12447. The air flow signal 122 is a signal variable in inverse proportion to the intake air flow rate admitted to the engine, and it is fed to the control unit 1000 via the wire harness 32. This signal is obtained by an air flow meter usually used in a fuel injection type engine. An engine temperature signal 123 is a signal variable in proportion to a coolant temperature of the engine 3, which signal is fed to the control unit 1000 via the wire harness 23. This signal is obtained by a thermistor which is sensitive to the temperature of an engine coolant.

All of the above mentioned input signals except the crankshaft torque signal 121 can be easily obtained in the manner as described in Laid-open Japanese Patent Application No. 57-185501.

An output shaft revolution speed signal 140 is a signal variable in proportion to the revolution speed of the output shaft of the transmission 4, which signal is fed to the control unit 1000 via a wire harness 24. This signal can be obtained by computing on a cycle or a frequency of a pulse signal that is generated by a similar means used to generate the crank angle signal 120. The output shaft torque signal 141 is a voltage signal which is proportional to the output shaft torque of the transmission 4, which signal is fed to the control unit 1000 via the wire harness 24. This signal can be generated by a similar torque sensor used to generate the crankshaft torque signal 121.

Hereinafter, output signals are described. The power source relay control signal 201 is provided to effect ON/OFF control of the power source relay 17 such that when the engine is in operation where the ignition switch 10 is placed to ON or START position, the power source relay 17 is turned ON, connecting the main power source 107 from the battery 15 via this power source relay 17 to the control unit 1000, and the power source relay 17 is kept closed even after the ignition switch 10 has been turned OFF until saving of the data is completed, keeping the connection of the main power source 107 to the control unit 1000. The data output signal 202 is delivered via the electric path 27 to the display 28, causing same to display a reduction ratio established in the transmission 4, a range selected by the select lever 14, and a result of diagnosis of the power train control system. One example of this data output signal 202 is described in Laid-open Japanese Patent Application No. 58-13140 where the data input signal 106 is also described.

An air flow control signal 220 contains a throttle opening instruction that is responsive to the accelerator signal 103 or a corrected throttle opening instruction that results from correcting the first mentioned instruction with various information and it is supplied via the wire harness 23 to the well known throttle actuator (see for example Published Japanese Patent Application No. 58-25853) mounted to the engine 3. Although, basically, the throttle opening degree of the engine is adjusted corresponding to the depression degree (accelerator signal 103), this signal causes the throttle actuator to adjust the throttle opening degree of the engine to a level contained by the throttle opening instruction in order to adjust the air flow rate admitted to the engine 3 to a value corresponding to the air flow control signal 220. The air flow control signal 220 adjusts the throttle opening degree via the throttle actuator so as to keep the idle revolution constant in a manner as described in Laid-open Japanese Patent Application No. 55-160137. When the data input signal 106 instructs a constant speed cruising, the air flow control signal 220 adjusts via the throttle actuator the throttle opening degree on a result of comparison of a measured vehicle speed with an instructed vehicle speed value (a feedback control) in order to cause the vehicle to run at the instructed vehicle speed value. The fuel injection control signal 221 is a pulse signal which controls the opening time of a fuel injection valve mounted to the engine, which signal is delivered from the control unit 1000 via the wire harness 23. As described in Laid-open Japanese Patent Application No. 55-125334, a basic control concept is that the above mentioned valve opening time duration (fuel injection amount), which is proportional to the intake air flow rate, is computed on the crank angle signal 120 and the air flow signal 122, and then this result is corrected in various manners, and the result is output in terms of the fuel injection control signal 221 in synchronous with the operation of the engine 3. As described in Laid-open Japanese Patent Applications Nos. 57-185501 and 54-58165, the ignition control signal 222 is a signal which controls the ignition energy and the ignition timing by controlling in synchronous with the crank angle signal 120, the time during which current is allowed to pass through a primary coil of an ignition coil provided to the engine 3 and the termination timing of the current supply. This signal is delivered from the control unit 1000 via the wire harness 23. The ignition energy is controlled such that it is kept unchanged with a variation in the engine revolution speed (the cycle or the frequency of the crank angle signal 120) and a variation in the voltage of the battery 15, and the ignition timing is determined on the engine revolution speed and crankshaft torque taking the output torque, fuel economy and exhaust gases into account. As described in Laid-open Japanese Patent Application No. 55-32918, the EGR control signal 223 is a signal relating to the opening degree of an exhaust gas recirculation valve (exhaust gas recirculation rate), which signal is delivered from the control unit 1000 via the wire harness 23. The EGR valve opening as mentioned above is determined on the engine revolution speed and the crankshaft torque taking the exhaust gas and fuel economy into account.

A reduction ratio control signal 240 is a signal corresponding to a reduction ratio (gear position) established in the transmission 4 and delivered from the control unit 1000 via the wire harness 24. The reduction ratio is determined on the input torque to the transmission (the engine crankshaft torque), i.e., the signal 121 or the signal (accelerator signal 103, intake air flow signal 122) corresponding to this signal 121, and the vehicle speed (output shaft revolution speed signal 140) taking the driving torque, fuel economy vaibrations into account. As described in Laid-open Japanese Patent Applications Nos. 57-47056, 56-24255 and 56-24256, the reduction ratio control signal 240 controls various kinds of shift solenoids of the transmission 4 in order to establish the desired gear position. The lock-up control signal 241 is a signal which controls connection and disconnection between the input and output elements of the torque converter in the transmission 4 and delivered from the control unit 1000 via the wire harness 24. As described in Laid-open Japanese Patent Applications Nos. 56-24255, 56-24256 and 57-33253, the lock-up control signal 241 is determined on the crankshaft torque (signal 121) and the vehicle speed (signal 140) taking the fuel economy and vibrations into account, in order to control the above mentioned connection or if desired a relative rotation (slip) between the input and output elements of the torque converter.

Figure 3:
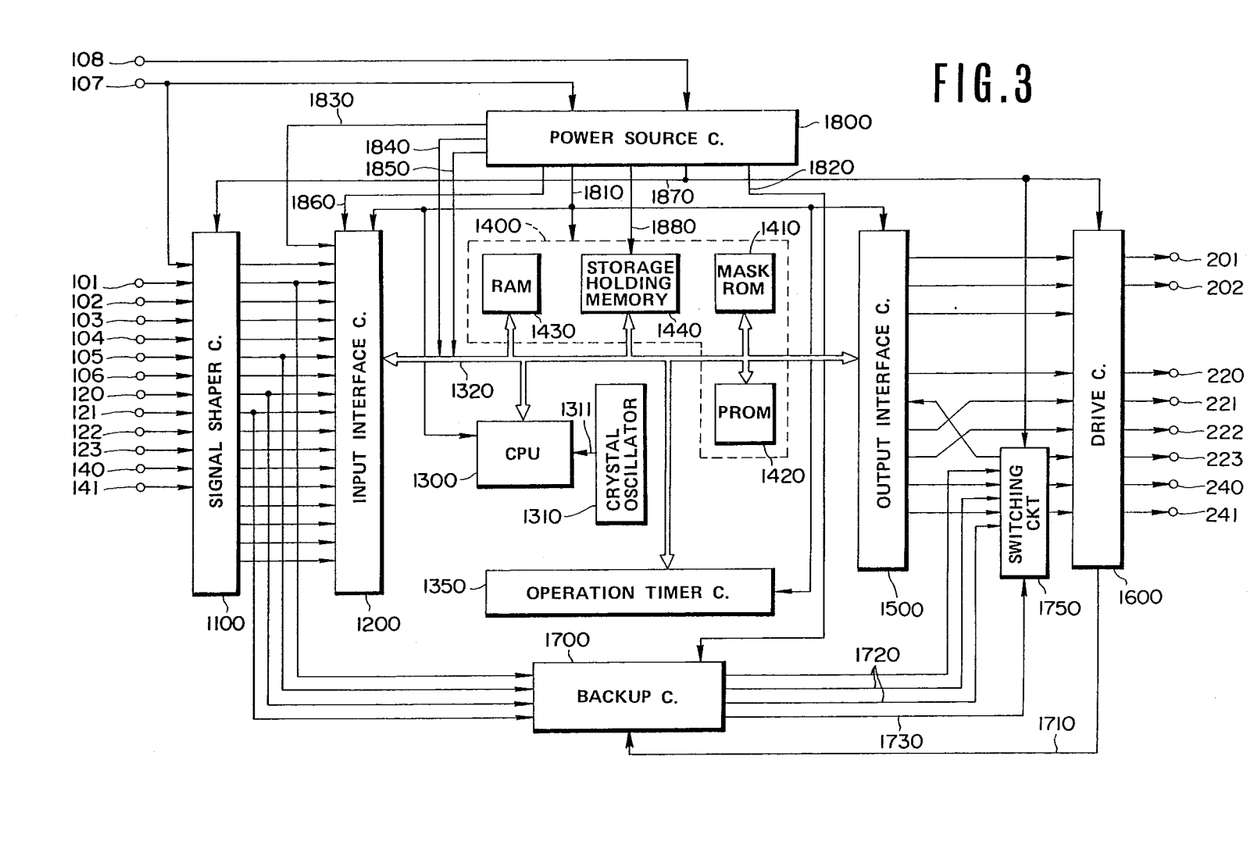
FIG. 3 is a detailed block diagram of the control unit.

Hereinafter, referring to FIG. 3, a practical example of the architecture of the control unit 1000 is described.

In this Figure, 1100 designates a signal shaper circuit which forms an input portion of the before mentioned various input signals 101 to 107, 120 to 123, 140, 141. It functions to eliminate noise of these input signals and absorbs surge thereof so as to prevent malfunction of the control unit 1000 caused by the noise and destruction thereof caused by the surge, and it also performs amplification of the various input signals and conversion thereof so as to shape these signals, thereby to allow an input interface circuit 1200 to perform an accurate operation. The input interface circuit 1200 effects analog to digital (A/D) conversion of the various input signals which have been shaped by the circuit 1100, counts pulses for a predetermined time, converts these signals into digital coded signals which can be read as input data by a centeral processing unit (CPU) 1300 and stores them into the corresponding internal registers. The CPU 1300 operates in synchronous with a clock signal generated based on an oscillating signal generated by a crystal oscillator 1310. The CPU 1300 is connected via a bus 1320 to the input interface circuit 1200, a memory 1400, an output interface circuit 1500 and an operation timer circuit 1350. When, in operation, it executes a control program stored in a mask ROM 1410 and a PROM 1420 of the memory 1400, the CPU 1300 reads various input data from the corresponding registers within the input interface circuit 1200, performs arithmetic operations on these input data to generate various output data, and delivers these output data to the corresponding registers within the output interface circuit 1500 with a predetermined timing. The memory 1400 is a storage device including in addition to the above mentioned mask ROM 1410 and the PROM 1420, a RAM 1430 and a storage holding memory 1440. The mask ROM 1410 is used to permanently store control programs and data used in executing the programs. The PROM 1420 is used to permanently store vehicle speed values, control programs which are subjected to alteration depending upon the engine 3 and the transmission in terms of their kinds, which data are written into the PROM 1420 when the latter is installed in the control system. The RAM 1430 is a random access memory which is able to read and write data and used to temporarily store intermediate data resulting from arithmetic operations performed by the CPU 1300, and temporarily store the final data resulting from the arithmetic operations executed by the CPU 1300 before they are delivered to the output interface circuit 1500. The storage contents immediately disappear when the main power source 107 is disconnected when the ignition switch 10 is turned OFF. The storage holding memory 1440 is used to store such data as those intermediate data and final data of the arithmetic operations executed by the CPU 1300 which are to be held even after the automotive vehicle stops its operation, and it can hold the above mentioned data owing to the continuously connected power source 108 even after the main power source 107 is disconnected when the ignition switch 10 is turned OFF.

The operation timer circuit 1350 is provided to reinforce the facilities of the CPU 1300. It comprises a multiplication circuit for speeding processing in the CPU 1300, an interval timer for causing an interrupt signal upon elapse of a predetermined time and a free-running counter used for measuring a time elapsed in the CPU 1300 for effecting a shift from a predetermined event to a next event and measuring the instant when the event takes place. The output interface circuit 1500 stores the output data from the CPU 1300 into the corresponding internal registers. It converts these data into pulse signals or into switching signals which go into "1" or "0" before delivering them to a drive circuit 1600. The drive circuit 1600 is a power amplifier circuit which performs voltage or current amplification of the signals from the output interface circuit 1500 so as to produce the before mentioned various output signals 201, 202, 220 to 223, 240, 241.

Designated by 1700 is a backup circuit which is activated by a monitor signal 1710 caused by monitoring the signals produced by the drive circuit 1600. When it is activated indicating that the CPU 1300 or the memory 1400 has failed to normally operate due to trouble, the backup circuit 1700 receives a portion of the signals from the signal shaper circuit 1100 and generates output signals which enable the engine 3 and the transmission 4 to continue to operate such that the automotive vehicle can continue its running and also a switching signal 1730 informing the occurrence of a trouble. The signals 1720 and 1730 are supplied to a switching circuit 1750, causing the switching circuit 1750 to cut off signals from the output interface circuit 1500 and supply in lieu thereof the signals 1720 from the backup circuit 1700 to the drive circuit 1600, thereby to enable the automoative vehicle to safety run to an auto repair shop.

Designated by 1800 is a power source circuit which is supplied with the main power source 107 and the continuously connected power source 108. The power source circuit 1800 supplies a constant voltage 1810 of 5 V from the main power source 107 to the input interface circuit 1200, CPU 1300, memory 1400, output interface circuit 1500 and operation timer circuit 1350. It also supplies another constant voltage 1820 of 5 V to the backup circuit 1700, a signal 1830 indicative of "ON" or "OFF" state of the ignition switch 10 to the input interface circuit 1200, a reset signal 1840 and a stop signal 1850 for stopping the operation of the CPU 1300 to the bus 1320, a constant voltage 1860 for the internal A/D converter to the input interface circuit 1200, and a main voltage 1870 to the signal shaper circuit 1100, drive circuit 1600 and switching circuit 1750. Besides, the power source circuit 1800 supplies a constant voltage 1800 of 5 V from the continuously connected power source 108 to the storage holding memory 1440 for enabling same to operate even after the ignition switch 10 has been turned OFF.

Figure 4:
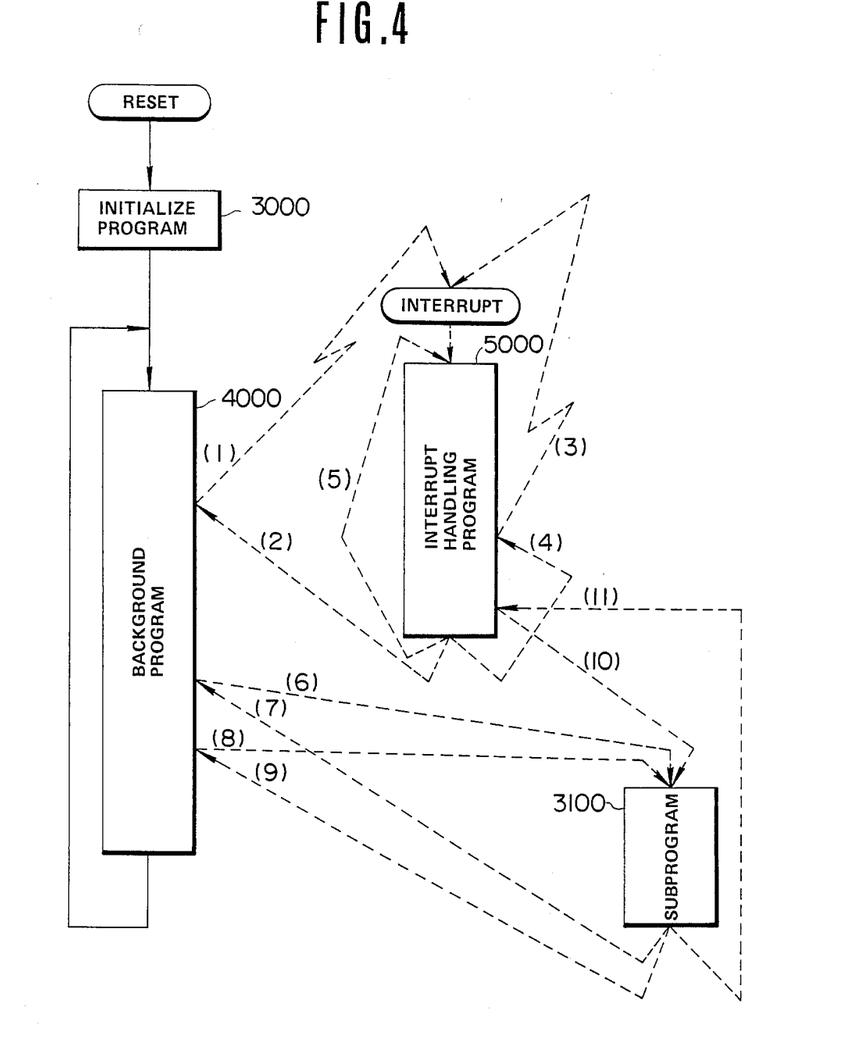
FIG. 4 illustrates a control concept carried out by the control unit.

Referring to FIG. 4, control programs for the control unit of the above construction and processing thereby are generally described.

The control programs comprise and can be generally devided into four groups, i.e., an initialize program 3000, a background program group 4000, an interrupt handling program group 5000 and a subprogram group 3100.

When the ignition switch 10 is turned ON and thus the main power source 107 is connected, the reset signal 1840 is generated by the power source circuit 1800, causing the control programs to be initiated to run from a RESET shown in FIG. 4. First, the initialize program 3000 is caused to run so as to set initial values in the RAM 1430, input and output interface circuits 1200, 1500 (initialization). After the initialization, the execution of the background program 4000 is caused and repeated. This program group comprises a plurality of programs listed in the corresponding items and these listed programs are caused to run sequentially in the order of arrangement of the items. Entry of an interruption signal causes an interruption if it occurs during the execution of the background program 4000, causing switching along a path as indicated by a broken arrow (1) to the interrupt handling program group 5000 which begins with INTERRUPT. (Although not so in this embodiment, the interruption of the initialize program 3000 may be possible if so desired.)

After identifying the interrupt signal, the program group 5000 selects one of a plurality of programs therein in response to the identified result and causes the selected program to run. After execution of the selected program, switching back to the interrupted portion of the background program group 4000 occurs along a path as indicated by a broken arrow (2), thus causing it to rerun.

If another new interruption signal enters during the execution of the interrupt handling program group 5000, switching to INTERRUPT along a path as indicated by a broken arrow (3) occurs, and a comparison is made between the interrupt handling program under execution and another interrupt handling program corresponding to the new interrupt signal so as to decide which one should be executed. In response to the decision result, one possibility is that the new interrupt signal causes switching to the new program corresponding to the new interrupt signal along a path as indicated by a broken line arrow (4) and after execution of this new program, the interrupted program is caused to rerun. Another possibility is that after executing the program under execution, switching occurs to the new program corresponding to the new interrupt signal along a path as indicated by a broken line arrow (5).

Among the plurality of programs belonging to the background program group 4000 and the plurality of programs belonging to the interrupt handling program group 5000, those which are frequently used are labelled as subprogram group 3100. When, during execution of a program belonging to the background program group 4000 or the interrupt handling program group 5000, a need for the above mentioned subprogram arises, switching to the subprogram 3100 occurs along a path indicated by a broken line arrow (6) or (8) or (10), causing the needed program therein to run. After the execution of this needed program, switching back to the interrupted program occurs along a path as indicated by a broken line arrow (7) or (9) or (11), causing it to rerun. Although it is possible to interrupt a subprogram under execution to cause another subprogram to be executed or to cause the interrupt handling program group 5000, this is not illustrated here in this figure for the sake of avoiding complexity.

If an interruption of a program causes a problem, entry of such interruption can be prohibited before the execution of the program until the end of the execution.

Figure 5A:
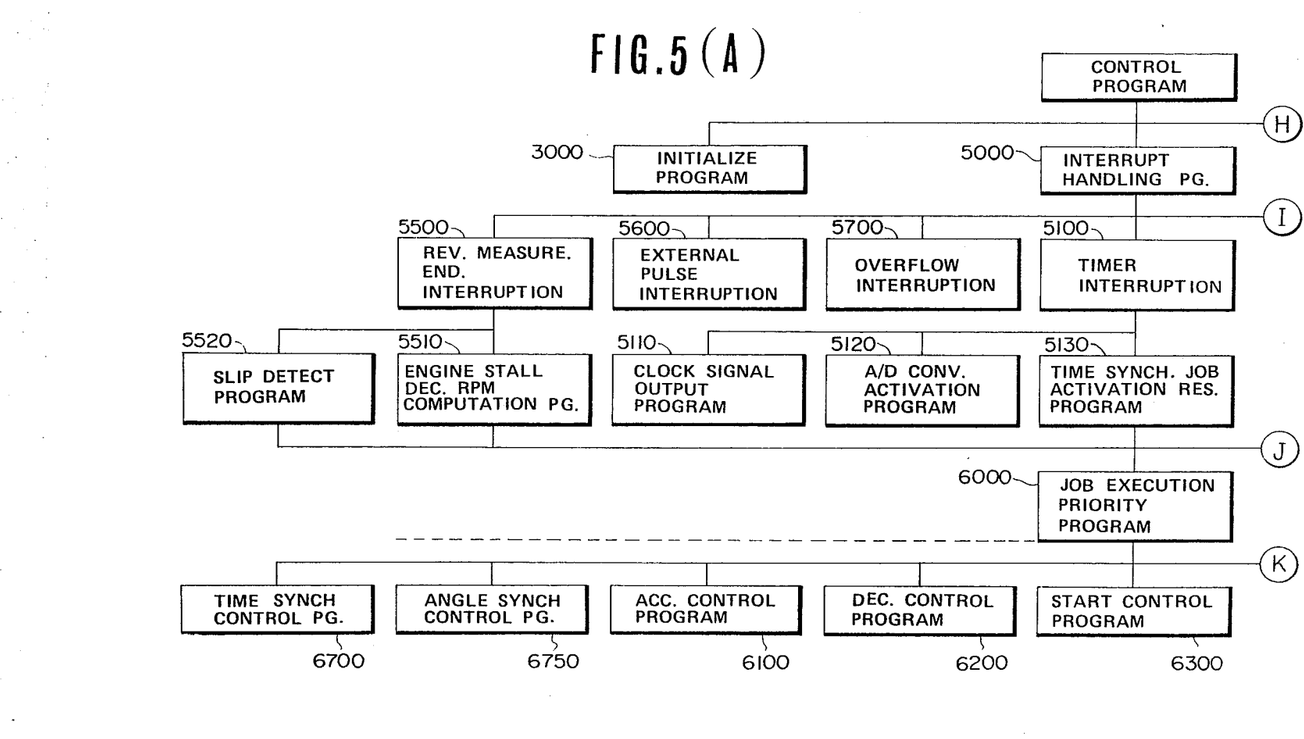
FIGS. 5(A) and 5(B), when combined, illustrate in detail the control relationship among programs stored in the control unit.
Figure 5B:
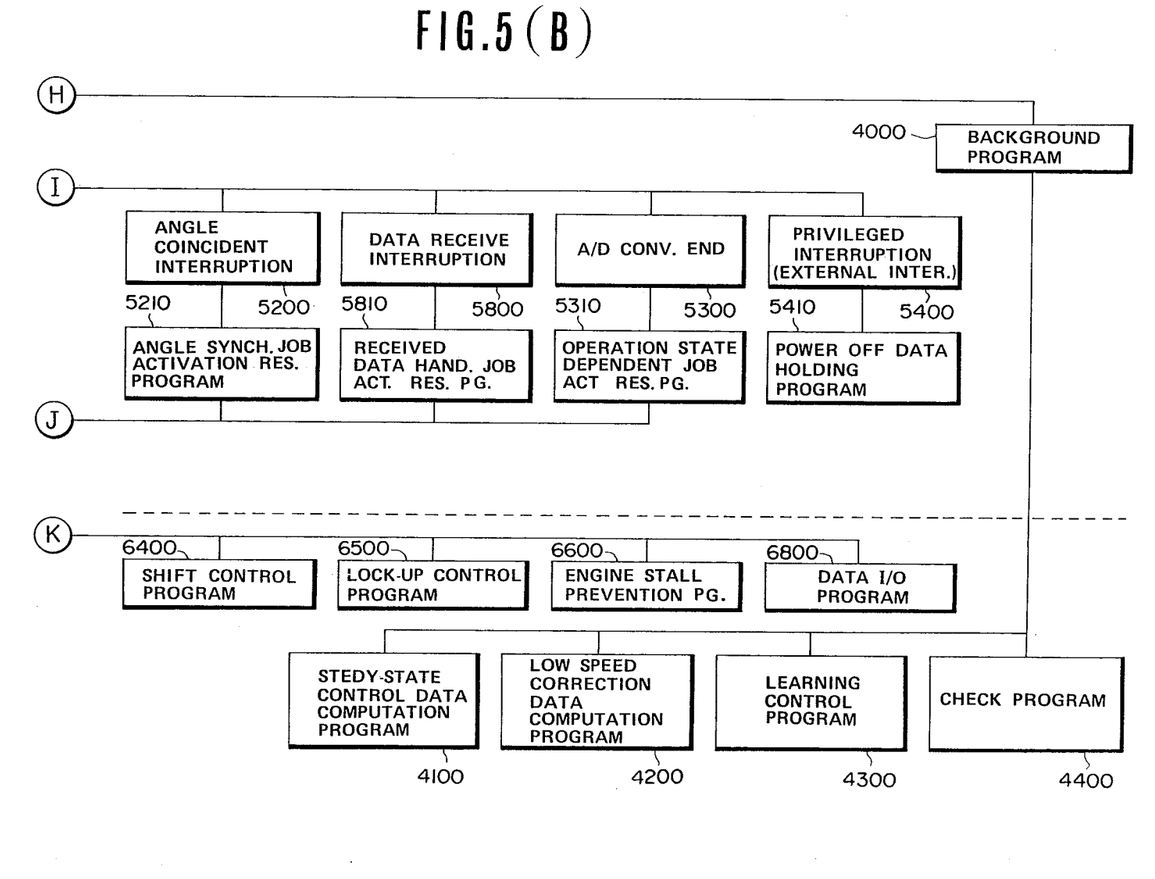

The detail of the control programs is illustrated in FIG. 5 which is hereinafter used in detail description of the control program.

When the ignition switch 10 is turned ON and the main power source 107 is connected, the reset signal 1840 is generated, causing the initialize program 3000 to run from a specified address called "reset vector address." The initialize program 3000 is executed to prepare arrangements for execution of various programs which follow by setting initial values in the CPU 1300, RAM 1430, input/output interface circuits 1200, 1500 (initializing). With this program, all of the locations in the RAM to be used by this microcomputer are cleared and all of the instructions necessary for operation of the input and output interface circuits 1200, 1500 and the operation timer circuit 1350, and the operation thereof is initiated. These instructions include an instruction to release an instruction mask for handling interruption signals, an instruction to set frequency of timer interruption, an instruction to set a measuring time for measuring each of various revolution speeds and a vehicle speed, an instruction to set a constant or constants relating to each of the output signals for one of various controls, and an instruction to set an initial state of each of the outputs. After initialization, an instruction authorizing an interruption is issued to the CPU 1300.

The execution of the background program 4000 continues during the normal operation of the CPU 1300, i.e., the operation of the CPU 1300 when there is no interruption requirement. With the background program group 4000, jobs which require less emergency are excecuted when the CPU 1300 is free, such as jobs requiring long operation time and jobs computing steady-state control constants. The background program group 4000 includes a steady-state control data computation program 4100, a low speed correction data computation program 4200, a learning control program 4300 and a check program 4400. These programs are executed sequentially in a predetermined order such that the top program is executed again after the execution of the bottom program and this cycle is repeated. In this manner, the control unit 1000 continues to generatethe output signals 201, 202, 220 to 223, 240, 241 uring the steady state operation of the automotive vhicle. The signals 220 to 223 are generated to control the engine 3 and the signals 240, 241 are generated for controlling the transmission 4 so as to adjust the engine 3 and the transmission 4 to the steady state operation of the automotive vehicle. The signal 201 is generated to hold the power source relay 17 in ON state so as to keep connection to the main power source 107 and the signal 202 is generated to cause the display 28 to display necessary information.

The interrupt handling program group 5000 is caused to run by an interruption of the execution of the background program group 4000 (or the initialize program 3000 if desired). The interrupt handling program group 5000 comprises a timer interrupt handling program 5100 (5110, 5120, 5130) an angle coincident interrupt handling program 5200 (5210), an A/D conversion handling program 5300 (5310), an external interruption (or a privileged interruption) handling program 5400 (5410), a revolution measurement end interruption handling program 5500 (5510, 5520), an external pulse interruption handling program 5600, an overflow interruption handling program 5700, and a data receive interruption handling program 5800 (5810) which are caused to be executed by the corresponding interruptions. It also includes a group of priority-basis-executing programs which are executed on priority which is decided by a job execution priority decision program 6000, which group of programs includes an acceleration control program 6100, a deceleration control program 6200, a start control program 6300, a shift control program 6400, a lock-up control program 6500, an engine stall prevention program 6600, a time synchronizing control program 6700, an angle synchronizing control program 6750 and a data input/output program 6800.

Describing these programs subsequently, entry of a timer interrupt causes a selection of the timer interruption program 5100 where the A/D conversion activation program 5120 is executed. This program 5120 manages the measurement of analog input signals by activating the A/D converter and switching the multiplexer in effecting the A/D conversion of the analog input signals for use in the subsequent control by switching the multiplexer. Then, the clock signal output program 5110 is executed. This program generates a clock signal with a predetermined cycle which indicates normal operation of each of the CPU 1300, memory 140, output interface circuit 1500, and thus informs the operating state of each of them. Finally, time synchronizing job activation reservation program 5130 is executed and places an activation of a time synchronizing control program 6700 (i.e., an activation requirement of this program) in the job execution priority program 6000. The time synchronizing control program processes jobs to be carried out in synchronous with a cycle of the clock signal.

Entry of an angle coincidence interruption (i.e., an interruption which occurs whenever the engine assumes a predetermined crank angle) causes the selection of the angle coincident interruption handling program 5200. This program causes an angle synchronizing job activation reservation program 5210 to place the activation (i.e., the activation requirement) of a job handling program (an angle synchronizing control program 6750) which needs to be processed in synchronous with the revolution of the engine on the job execution priority decision program 6000.

Entry of an A/D BUSSY flag check interruption causes a selection of the A/D conversion end handling program 5300 where a decision is made on checking the A/D BUSSY flag whether or not the A/D conversion has ended. When it has ended, an operation state dependent job activation reservation program 5310 instructs the storage of A/D converted data into the corresponding location in the RAM 1430 in accordance with A/D conversion channel data, and although this will be specifically described later, it decides the operation state of the automotive vehicle on a time series data of the A/D converted values relating to the acceleration signal 103 and places the activation requirement of an appropriate operation state dependent job handling program for this operating state (such as the acceleration control program, deceleration control program and start control program) on the job execution priority decision program 6000.

Entry of an external interruption causes a selection of the external interruption handling program 5400. The external interruption, i.e., an emergency interruption, is generated when the main power source 107 is disconnected. The program 5400 selected by entry of this interruption. This program 5400 cuases the execution of a power off data holding program 5410 where data to be preserved for learning control and the like are moving from the RAM 1430 to the storage holding memory 1440.

Entry of an interruption occurring upon completion of measurement of an engine revolution speed (signal 120) or an output shaft revolution speed (signal 140) causes a selection of the revolution measurement end interruption handling program 5500. The execution of this program 5500 is activated by an interruption requirement which occurs after completion of measurement by a circuit provided in the input interface circuit 1200 which is designed to measure the crank angle signal 120 or the output shaft revolution speed signal 140 in terms of counting the number of input pulses during a predetermined period of time. After completion of the measurement of the engine revolution speed (signal 120), the engine stall decision rpm program 5510 is executed which reads in the engine revolution speed and makes a decision whether or not the engine is likely to stall. When the decision determines that the engine stall is likely to occur, the activation requirement for the execution of the engine stall prevention program 6600 is reversed in the job execution priority program 6000. After completion of the measurement of the output shaft revolution speed (signal 140), a slip detect program 5520 is executed where based on the output shaft revolution speed and the other data, a slip rate is computed in a manner which will be described later, and a decision is made whether or not the computed slip rate is greater than a predetermined value. When the decision determines that the slip rate is greater than the predetermined value, the activation requirement for the execution of a start control program 6300 is reversed in the job execution priority program 6000 at start-up or that for the execution of an acceleration control program 6100 is reserved in the job execution priority program 6000.

The external pulse interruption handling program 5600 is caused to be executed upon manipulation of a key on a key board or entry of a pulse signal from an external device. This program causes execution of a corresponding control to the pulse signal. The overflow interruption handling program 5700 is caused to be executed by entry of an interruption which is generated upon overflow of the timer and performs a predetermined process.

The data receive interruption handling program 5800 is caused to be executed by entry of a data receive interruption and causes the execution of the received data handling job activation program 5810. With the execution of this program 5810, the received data is stored at a predetermined location in the RAM 1430 and then the activation of the received data handling job (i.e., the requirement for the activation thereof) is placed on the job execution priority program 6000.

The job execution priority decision program 6000 receives the various activation requirements of job handling programs selected by the above mentioned interrupt handling programs and causes the contents of the corresponding bits (flags) in the RAM 1430 to the selected job programs to go from "0" to "1". Since a predtermined execution priority level is originally allocated to each job program, the sequence of location and bit for each job program is determined in accordance with the predetermined priority level. In the case of this program, a check is made starting with the high-order bit sequentially down to the low-order bit in a location in the RAM 1430, and when a program is reserved, this program is executed and the reservation indicator is cancelled (by resetting the flag to "0"). When the execution of this program ends, the JOB execution priority decision program 6000 is executed and a reserved program of the next lower priority level is caused to be executed and the reservation therefor is cancelled, and after the execution of all of the reserved programs has ended, switching to the background program 4000 occurs.

Hereinafter, a group of those job programs which are to be executed on the priority determined by the program 6000 are described. The acceleration control program 6100 computes output control data relating to optimal fuel injection amount, ignition timing, exhaust gas recirculation flow rate, intake air flow rate, reduction ratio and lock-up schedule for the degree of acceleration. For example, in the case of a rapid acceleration (i.e., in the case of rapid increase in the accelerator signal 103), they are controlled such that for increasing the output of the engine, the fuel injection amount is increased, the ignition timing is advanced, the EGR flow rate is reduced and the intake air flow rate is increased, and in addition to increasing the output torque from the transmission 4, the lock-up of the torque converter is released and the reduction ratio is increased. When the slip rate is greater than the predetermined value at acceleration, meaning that the driving wheels are slipping, the engine 3 is controlled to decrease its output torque, such as by correcting the air flow signal 122, in order to prevent the occurrence of slip.

A deceleration control program 6200 computes, at deceleration, various control output data which are optimal for the degree of deceleration, vehicle speed and engine revolution speed. At deceleration, the engine 3 is controlled such that the fuel injection amount is zero or very small and the transmission 4 is controlled such that the reduction ratio and the operating state of the torque converter cooperate with each other to provide the most appropriate deceleration conditions.

The start control program 6300 computes and outputs various control data 120 to 123 and control data 140, 141 in order to control the engine 3 and the transmission 4 such that a sufficiently great starting torque is obtained at the start-up of the automotive vehicle. When the slip rate exceeds the predetermined value at start-up, the engine 3 is controlled to decrease its output torque, such as by correcting the air flow signal 220, in order to prevent the occurrence of slip.

The shift control program 6400 computes various output data used for controlling the shift in the transmission 4 and the output torque and the revolution speed of the engine 3 in order to prevent substantial shocks from being transmitted to vehicle passengers during the shifting operation in the transmission 4.

The lock-up control program 6500 computes various output data for controlling lock-up operation of the torque converter and the output of the engine in order to reduce shocks occurring upon lock-up operation and relesese thereof.

The engine stall prevention control program 6600 is caused to be executed when it is anticipated that the engine stall tends to occur by deciding a state of variation in the engine revolution speed during the execution of said program 5510. It computes various control output data so as to control the engine 3 and the transmission 4 such that, for preventing the engine stall, the engine output is increased immediately and the load is decreased.

The time synchronizing control program 6700 which is reserved and executed after lapse of each cycle, updates various data and writes the control data of the preceding cycle into the output interface circuit 1500.

The execution of an angle synchronizing program 6750, which is reserved and executed whenever the engine 3 assumes a predetermined crank angle, updates various data and writes control data into the output interface circuit 1500.

The data input/output control program 6800, which is reserved and executed upon lapse of a predetermined time or upon entry of a data receive interruption, stores the data after deciding the content thereof upon data reception, alters the state of control and outputs of the content of the data upon effecting data transmission.

The operation of the above embodiment is described in terms of how to detect a slip and control the power train upon detecting the slip in order to prevent the slip from occurring.

Figure 6:
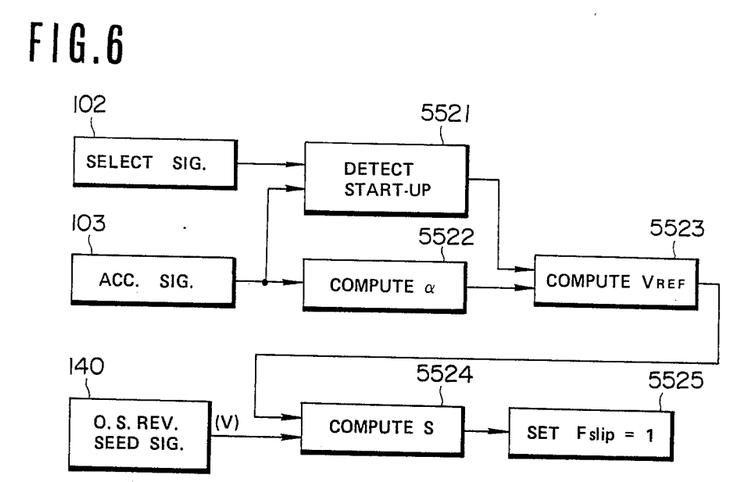
FIG. 6 is a block diagram illustrating in a simple manner processing carried out by a slip detect program.

As previously described, entry of an interruption which is caused upon completion of measurement of the output shaft revolution speed (signal 140) causes the slip detect program 5520 to run. This program 5520 performs processing on the output shaft revolution speed data V in such a manner as illustrated in FIG. 6 in order to make a decision whether or not a slip has occurred. The output shaft revolution speed data V is stored in the input interface circuit 1200 after the completion of measurement of the signal 140. In FIG. 6, the block diagram is used to describe the program 5520 for ease of understanding although it is the common practice to use a flowchart.

Referring to FIG. 6, the select signal 102 and the accelerator signal 103 are processed to detect a state when the vehicle starts (block 5521). Putting it concretely, a logical decision is made that the vehicle is about to start when the select signal 102 indicates one of running ranges D, I and II except neutral (N) or parking (P), and the accelerator signal 103 indicates any depression of the accelerator pedal. Next, acceleration $\alpha$ of the vehicle is computed using the following equation, $$\alpha = (\text{DRIVING OUTPUT} - \text{LOSS})/(\text{VEHICLE MASS}).$$

The driving output is given as a function of the accelerator signal 103 such as by table lock-up. The driving output is determined on the torque of the engine considering a reduction ratio in the transmission and the transmission efficiency in the torque converter. The driving output is considered to be substantially constant immediately after start-up and thus can be determined by the accelerator signal 103. For the subsequent running states including acceleration, it is necessary to vary the driving output also with the reduction ratio in the transmission and the transmission efficiency of the torque converter. Considering the variation in each of these factors, the acceleration should be set at a relatively low value. Although it may be considered to be constant immediately after start-up, the loss grows during the subsequent running states owing to an increase in the accelerator signal 103 and increases in air resistance and rolling resistance.

A target vehicle speed $V_{REF}$, i.e., a desired vehicle speed, is computed (see block 5523) by performing time integration on the vehicle acceleration $\alpha$ after start-up determined as described above. Computation is performed on the target vehicle speed $V_{REF}$ and an output shaft revolution speed data V (peripheral speed of the driving wheel) obtained by measurement of the output shaft revolution speed signal 104 (see block 5524) to give a slip rate S using the equation as follows:

$$S = (V - V_{REF})/V.$$

The slip rate S is zero when there is no slip of the driving wheels 2L, 2R because $V = V_{REF}$, and it grows toward 1 as the slip occurs and grows because $V > V_{REF}$ holds. This means that the slip rate S is an indication of whether or not there is the occurrence of slip. Therefore, when the slip rate S exceeds a predetermined value, a slip occurrence flag Fslip is set at "1" state (see block 5525). This flag Fslip is used as a requirement for activation of the execution of the start control program 6300 or acceleration control program 6100 upon occurrence of slip and generated to the job execution priority program 6000 and reserved.

Figure 7:
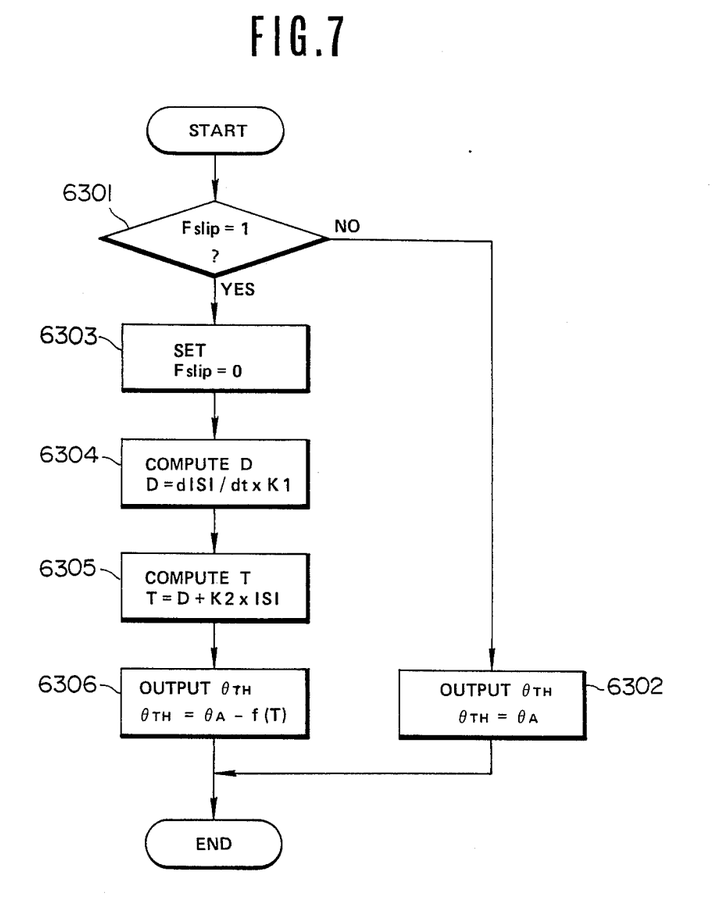
FIG. 7 is a flowchart of a start control program.

When the driving wheels slip at start-up, the job execution priorty program 6000 causes the start control program 6300 to run when its turn of execution comes and resets the flag Fslip to "0". The start control program 6300 runs along a flowchart as shown in FIG. 7. Referring to FIG. 7, a decision is made in a step 6301 whether or not the flag Fslip is "1". When this decision determines that the flag Fslip is zero meaning there occurs no slip, a step 6302 is executed where no correction is made of the throttle opening degree $\theta_{TH}$ (air flow control signal 220), i.e., the throttle throttle opening degree $\theta_{TH}$ is kept the same as the throttle opening degree $\theta_A$ (the before mentioned basic throttle opening instruction) which corresponds to the accelerator signal 103. When the decision determines the flag Fslip is "1", meaning that there occurs slip, the step 6301 selects steps 6303 to 6306 subsequently so as to decrease the output torque of the engine 3 thereby to prevent occurrence of slip.

The flag Fslip is reset to "O" in the step 6303, and then a time derivative is performed on an absolute value of said slip rate S and a constant $K_1$ is multiplied with this result to give a slip rate first derivative D in the step 6304. In the subsequent step 6305, a proportional portion expressed by multiplication of the absolute value of the slip rate S with a constant $K_2$ is added to the derivative D to give a torque correction T (an excess of torque which causes the occurrence of slip), and then in the step 6306 a throttle opening degree correction f(T) is given which corresponds to the torque correction T by arithmetic operation or table lock-up, and the throttle opening degree correction f(T) is subtracted from the throttle opening degree $\theta_A$ corresponding to the accelerator signal 103 to give a corrected throttle opening degree, and this corrected throttle opening degree is generated as a throttle opening degree $\theta_{TH}$ in terms of a corresponding air flow control signal.

In accordance with this air flow control signal 220, the throttle actuator adjusts the throttle opening of the engine to the above mentioned corrected throttle opening degree, thus cuasing the engine to reduce its output torque in response to the degree of slip taking place immediately after the slip has occurred owing to PD control, thus causing the engine to reduce its output torque to a level where the slip disappears. When a slip occurs at acceleration, the job execution priority program 6000 causes the acceleration control program 6100 to run when its turn of execution comes and resets the flag Fslip to "0". The content of this program 6100 is similar to that shown in FIG. 7 and thus prevents the occurrence of slip in a manner like the processing by the start control program 6300.

Figure 8:
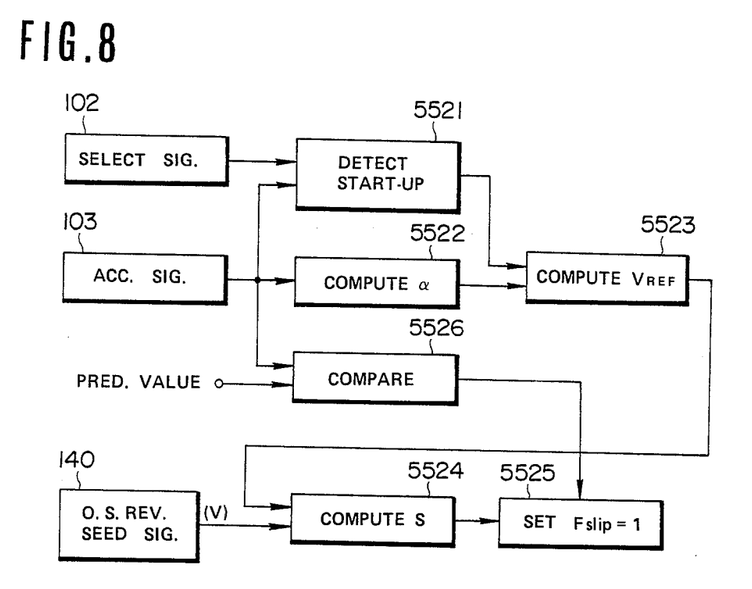
FIG. 8 is a block diagram similar to FIG. 6 and illustrates a second embodiment.
Figure 9:
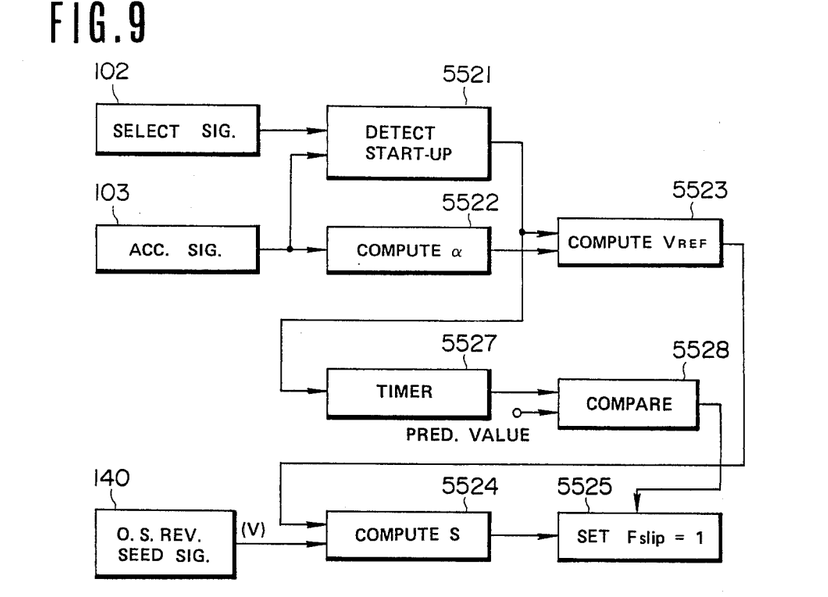
FIG. 9 is a block diagram similar to FIG. 6 and illustrates a third embodiment.
Figure 10:
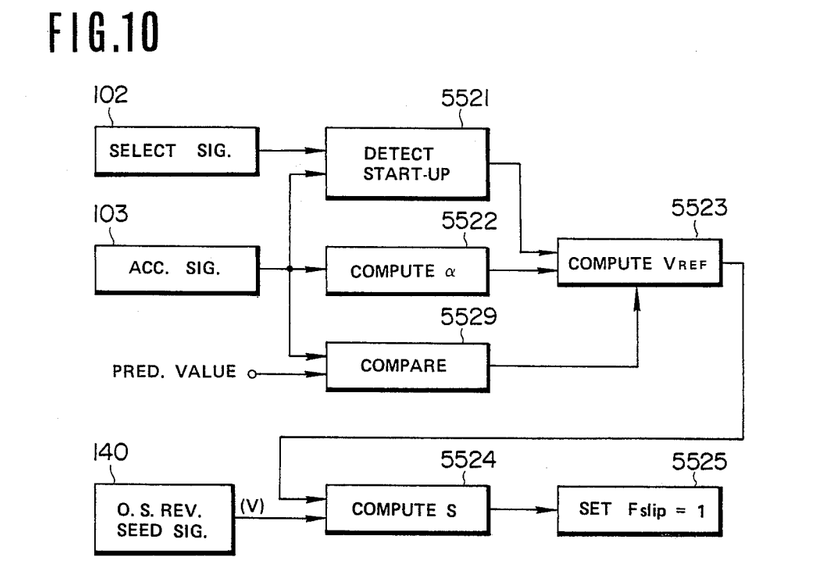
FIG. 10 is a block diagram similar to FIG. 6 and illustrates a fourth embodiment.

Referring to FIGS. 8 to 10, three other embodiments according to the present invention are hereinafter described.

Referring to FIG. 8, the second embodiment is substantially similar to the first embodiment illustrated in FIG. 6 except the provision of additional processing as illustrated by a comparison block 5526 so as to prevent a flag Fslip from being reset to "1" when an accelerator signal 103 is greater than a predetermined value. When the accelerator signal 103 is greater than the predtermined value, indicating an emergency state wherein the driver wishes a rapid accleration to avoid danger or the like, the slip preventing control whereby a reduction in an engine output torque is caused is not performed, thus allowing the vehicle to continue to run with a relatively high output torque although its driving wheels slip. Since the driver will not depress the accelerator pedal deeply during running on a road condition where the driving wheels are very likely to slip, such as snowy or muddy roads, the above function does not pose any problem.

Referring to FIG. 9, the third embodiment is substantially the same as the first embodiment illustrated in FIG. 6 except the provision of a timer block 5527 and a comparison block 5528. Measurement of time lapsed from start-up is cuased to begin (see block 5527) upon receiving from a block 5521 a signal indicative of the initiation of start-up. When the measured time exceeds a predetermined value, a signal is output from the comparison block 5528 to a block 5525 so as to prohibit a slip flag Fslip being set to "1". With this control, the slip preventing control is allowed to be carried out at start-up period only. Thus, torque shortage owing to a reduction in output torque which results from the slip preventing control is prevented during the subsequent running after start-up.

Referring to FIG. 10, the fourth embodiment is described. This embodiment is substantially similar to the first embodiment illustrated in FIG. 6 except the provision of a comparison block 5529. When the accelerator signal 103 is less than a predetermined value which indicates a state wherein a driver released the accelerator pedal, i.e., when the driver wishes to cause the vehicle to stop running, a target vehicle speed $V_{REF}$ that is to be computed (see block 5523) is reset to zero. This causes the target vehicle speed $V_{REF}$ to be reset to zero whenever the driver releases the accelerator pedal, thereby to prevent accumulation of errors so that the target vehicle speed $V_{REF}$ computed by the before described integration is always kept accurate.

Although, in the previously described embodiments, the accelerator signal 103 is used to compute the vehicle acceleration $\alpha$, any signal indicative of the driving force of the engine, such as the output shaft torque signal 141, may be used for the computation. In the case where the output shaft torque signal 141 is used, more accurate vehicle acceleration can be given because the actual driving output of the power train is used for the computation.

Although, in the previous embodiments, the throttle opening degree of the engine (air flow control signal 220) is corrected in carrying out the slip preventing control, a fuel injection control signal 221 or an ignition control signal 222 may be corrected to control the engine or a reduction ratio control signal 240 may be corrected to control the transmission or combination of at least two of these corrections is possible.

It will now be appreciated that since the occurrence of a slip is detected on a difference between a desired target vehicle speed $V_{REF}$ by the vehicle in an operating state (in the illustrated embodiment a vehicle acceleration $\alpha$ resulting from computation on an accelerator signal indicative of a throttle opening degree) of a power train and a driving wheel peripheral revolution speed V given by an output shaft revolution speed signal 140, the target vehicle speed $V_{REF}$ and the driving wheel peripheral revolution speed which are needed can be given by using signals (accelerator signal 103, output shaft revolution speed signal 140) which are usually used for controlling the power train. Therefore, there are required no sensors for detecting revolution speed of the wheels, thus providing a slip detector with less components, simple in construction and less expensive. Besides, since the number of means for generating input signals are only two because only two input signals are required, the rate of failures can be suppressed to low level.

What is claimed is:

1. In an automotive vehicle having an internal combustion engine and a driving wheel which is driven by power produced by the internal combustion engine from a power train of the automotive vehicle, a method of detecting a slip of the driving wheel, comprising:
   detecting an operation parameter which has a predetermined relationship with a driving ouput of the automotive vehicle and generating an operation parameter indicative signal;
   determining the driving output using said predetermined relationship in response to said operation parameter indicative signal and generating a driving output indicative signal;
   determining an acceleration of the automotive vehicle in response to said driving output indicative signal and generating an acceleration indicative signal;

determining a target vehicle speed from said acceleration indicative signal and generating a target vehicle speed indicative signal;

detecting a peripheral speed of the driving wheel and generating a peripheral speed indicative signal; and determining the presence of a slip in response to a difference between said target vehicle speed indicative signal and said peripheral speed indicative signal and generating a slip indicative signal when a slip is determined to be present.

2. A method as claimed in claim 1, wherein the generation of said slip indicative signal is suspended when a depression degree of an accelerator pedal of the automotive vehicle is greater than a predetermined value.

3. A method as claimed in claim 1, wherein the generation of said slip indicative signal is suspended until a predetermined time lapse after start-up of the automotive vehicle.

4. A method as claimed in claim 1, wherein said target vehicle speed indicative signal is reset to zero whenever a depression degree of an accelerator pedal is less than a predetermined value.

5. A method as claimed in claim 1, wherein the step of determining the presence of a slip comprises:

(i) calculating said difference between said target vehicle speed indicative signal and said peripheral speed indicative signal;

(ii) comparing said difference with said peripheral speed indicative signal; and (iii) generating said slip indicative signal when said comparison exhibits a predetermined relationship.

6. A method as claimed in claim 5, wherein the step of determining said target vehicle speed comprises performing a time integration of said acceleration indicative signal.

7. A method as claimed in claim 1, wherein the step of determining said target vehicle speed comprises performing a time integration of said acceleration indicative signal.

8. In an automotive vehicle having an accelerator pedal, an internal combustion engine including a throttle valve and a driving wheel and a power train operatively disposed between the internal combustion engine and the driving wheel to transmit power produced by the internal combustion engine to the driving wheel, a method of operating the automotive vehicle, comprising the steps of:

detecting an operation parameter which has a predetermined relationship with a driving output of the automotive vehicle and generating an operation parameter indicative signal;

determining said driving output of the automotive vehicle using said predetermined relationship in response to said operation parameter indicative signal and generating a driving output indicative signal;

determining an acceleration of the automotive vehicle in response to said driving output indicative signal and generating an acceleration indicative signal;

determining a target vehicle speed in response to said acceleration indicative signal and generating a target vehicle speed indicative signal;

detecting a peripheral speed of the driving wheel and generating a peripheral speed indicative signal;

determining the presence of a slip in response to a difference between said target vehicle speed indicative signal and said peripheral speed indicative signal;

generating a slip indicative signal after a predetermined condition has been satisfied after said step of determining the presence of said slip; and controlling the internal combustion engine in response to said slip indicative signal so as to cause a drop in output torque produced by the internal combustion engine.

9. A method as claimed in claim 8, wherein said step of detecting said operation parameter comprises a step of detecting a depression degree of the accelerator pedal so that said operation parameter indicative signal produces an accelerator signal indicative of the depression degree of the accelerator pedal.

10. A method as claimed in claim 9, wherein said step of detecting the peripheral speed of the driving wheel comprises a step of detecting a revolution speed of an output shaft of the power train.

11. A method as claimed in claim 9, wherein said predetermined condition is defined by a state where said accelerator signal is greater than a predetermined value.

12. A method as claimed in claim 9, wherein said step of determining said target vehicle speed comprises a step of resetting said target vehicle speed indicative signal to zero when said accelerator signal is less than a predetermined value.

13. A method as claimed in claim 8, wherein said step of determining said target vehicle speed comprises a step of performing a time integration of said acceleration indicative signal.

14. A method as claimed in claim 8, wherein said predetermined condition is defined by a state where a predetermined time has lapsed after start-up of the automotive vehicle.

* * * * *